(12) United States Patent
Jepsen et al.

(10) Patent No.: US 8,478,132 B1
(45) Date of Patent: Jul. 2, 2013

(54) SYSTEMS AND METHODS FOR REDUCING MECHANICAL SENSITIVITY OF PHASE SENSITIVE OPTICAL SIGNALS

(75) Inventors: Kim S. Jepsen, Ellicott City, MD (US); Raymond Zanoni, Collumbia, MD (US); Mark A. La Liberte, Columbia, MD (US); Alistair J. Price, Ellicott, MD (US); Peter J. Morgan, Gleneig, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 384 days.

(21) Appl. No.: 12/819,481

(22) Filed: Jun. 21, 2010

(51) Int. Cl.
*H04B 10/00* (2006.01)
*H04B 10/12* (2006.01)

(52) U.S. Cl.
USPC ............... 398/152; 398/184; 398/205

(58) Field of Classification Search
USPC ............... 398/152, 184, 205, 140, 141, 142, 398/182, 202, 212, 214; 380/256
See application file for complete search history.

(56) References Cited

U.S. PATENT DOCUMENTS

2008/0267635 A1* 10/2008 Kawamoto et al. ........... 398/141
2011/0182573 A1*  7/2011 Westlund et al. ............... 398/25

* cited by examiner

*Primary Examiner* — Danny W Leung
*Assistant Examiner* — Daniel Dobson
(74) *Attorney, Agent, or Firm* — Donna P. Suchy; Daniel M. Barbieri

(57) ABSTRACT

The present invention is an optical system configured for enabling co-transmission (ex.—co-propagation) of a reference signal and a carrier signal (ex.—or a phase encoded signal and a reference signal) in a same fiber. Since it is configured for enabling said co-transmission, the optical system of the present invention promotes reduced transmission microphonic sensitivity in the optical system.

17 Claims, 9 Drawing Sheets

SYSTEMS AND METHODS FOR REDUCING MECHANICAL SENSITIVITY OF PHASE SENSITIVE OPTICAL SIGNALS

FIELD OF THE INVENTION

The present invention relates to the field of advanced radio systems and particularly to system(s) and method(s) for reducing mechanical sensitivity of phase sensitive optical signals.

BACKGROUND OF THE INVENTION

In a number of currently available phase-sensitive optical systems or phase-encoded optical systems, it may be desirable to transmit a phase reference from a transmitter of the system to a receiver side of the system to act as a local oscillator for phase demodulation of an optical signal. The short wavelength of the optical signal means that such optical systems may be sensitive to low-amplitude vibrations (ex.— microphonics) on a transmission fiber of the system.

Thus, it would be desirable to provide a solution for reducing microphonic sensitivity of such systems.

SUMMARY OF THE INVENTION

Accordingly, an embodiment of the present invention is directed to an optical system, including: a laser device, the laser device configured for transmitting a laser signal; a first polarization beam combiner, the first polarization beam combiner being connected to the laser device via a first polarization maintaining fiber portion, the first polarization maintaining fiber portion implementing a forty-five degree polarization maintaining splice, the forty-five degree polarization maintaining splice configured for splitting the laser signal to provide a carrier signal and a reference signal to the first polarization beam combiner via the first polarization maintaining fiber portion; a data encoder, the data encoder being connected to the first polarization beam combiner via a second polarization maintaining fiber portion, the data encoder configured for receiving the carrier signal from the first polarization beam combiner via the second polarization maintaining fiber portion, the data encoder configured for providing a phase encoded signal based upon the received carrier signal; a second polarization beam combiner, the second polarization beam combiner being connected to the data encoder via a third polarization maintaining fiber portion, the second polarization beam combiner being connected to the first polarization beam combiner via a fourth polarization maintaining fiber portion, the second polarization beam combiner configured for receiving the phase encoded signal from the data encoder via the third polarization maintaining fiber portion, the second polarization beam combiner being configured for receiving the reference signal from the first polarization beam combiner via the fourth polarization maintaining fiber portion; a third polarization beam combiner, the third polarization beam combiner being connected to the second polarization beam combiner via a fifth polarization maintaining fiber portion, the third polarization beam combiner configured for receiving the phase encoded signal and the reference signal from the second polarization beam combiner via the fifth polarization maintaining fiber portion; a time delay component, the time delay component being connected to the third polarization beam combiner via a sixth polarization maintaining fiber portion, the sixth polarization maintaining fiber portion implementing a ninety degree polarization maintaining splice, the time delay component configured for receiving the reference signal from the third polarization beam combiner via the sixth polarization maintaining fiber; and a phase demodulator, the phase demodulator being connected to the third polarization beam combiner via a seventh polarization maintaining fiber portion, the phase demodulator being connected to the time delay component via an eighth polarization maintaining fiber portion, the phase demodulator configured for receiving the reference signal from the time delay component, the phase demodulator further configured for receiving the phase encoded signal from the third polarization beam combiner, the phase demodulator further configured for demodulating the phase encoded signal and providing a demodulated signal output based upon the received phase encoded signal and the received reference signal; wherein the carrier signal and the reference signal propagate through the first polarization maintaining fiber portion in a same direction and the phase encoded signal and the reference signal propagate through the fifth polarization maintaining fiber portion in a same direction.

An additional embodiment of the present invention is directed to a method for optical signal routing in an optical system, said method including: transmitting an optical signal from a signal generating device onto a first PM fiber portion; directing the transmitted optical signal, via the first PM fiber portion, to a first PM circulator; splitting the transmitted optical signal via the first PM circulator, to produce a carrier signal and a reference signal; directing the carrier signal and the reference signal from the first PM circulator to a first polarization-maintaining component via the first PM fiber portion; transmitting the carrier signal from the first polarization-maintaining component to a data encoder via a second PM fiber portion; generating a phase encoded signal via the data encoder, the phase encoded signal being based upon the carrier signal; transmitting the phase encoded signal from the data encoder to a second polarization-maintaining component via a third PM fiber portion; transmitting the reference signal from the first polarization-maintaining component to the second polarization-maintaining component via a fourth PM fiber portion; transmitting the phase encoded signal and the reference signal from the second polarization-maintaining component to a third polarization-maintaining component via a fifth PM fiber portion; transmitting the reference signal from the third polarization-maintaining component onto a sixth PM fiber portion; directing the reference signal, via the sixth PM fiber portion, to a second PM circulator; transmitting the reference signal from the second PM circulator to a time delay component; transmitting the carrier signal from the third polarization-maintaining component to a phase demodulator via a seventh PM fiber portion; transmitting the reference signal from time delay component to the phase demodulator via an eighth PM fiber portion; and demodulating the phase encoded signal and providing a demodulated signal output via the phase demodulator, the demodulated signal output being based upon the phase encoded signal and the reference signal.

A still further embodiment of the present invention is directed to a method for optical signal routing in an optical system, said method including: transmitting an optical signal from a signal generating device to a signal splitting component via a first polarization-maintaining (PM) fiber portion; splitting the optical signal, via the signal splitting component, into a reference signal and a carrier signal; transmitting the carrier signal from the signal splitting component to a data encoder via a second PM fiber portion; transmitting the reference signal from the signal splitting component to a first time delay component via a third PM fiber portion; producing a phase encoded signal via the data encoder, said phase encoded signal being based upon the carrier signal; transmitting the phase encoded signal from the data encoder to a PM component via a fourth PM fiber portion; transmitting the reference signal from the first time delay component to the PM component via a fifth PM fiber portion; transmitting the phase encoded signal and the reference signal from the PM component to an active demultiplexer via a sixth PM fiber portion; transmitting the reference signal from the active demultiplexer to a second time delay component via a seventh PM fiber portion; transmitting the phase encoded signal from the active demultiplexer to a phase demodulator via an eighth PM fiber portion; transmitting the reference signal from the second time delay component to the phase demodulator via a ninth PM fiber portion; and demodulating the phase encoded signal and providing a demodulated signal output via the phase demodulator, the demodulated signal output being based upon the phase encoded signal and the reference signal.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Phase modulated transmission systems require the presence of a stable phase reference at the receiver. In certain systems, it is beneficial to transmit the optical phase reference from the transmitter as opposed to recovering the optical phase at the receiver (ex.—remotely sampled photonic ADCs). Photonic phase modulated systems are susceptible to microphonics, where the phase of the reference may be modulated by low amplitude acoustic waves. For such systems, phase disturbances from microphonics can be minimized by transmitting the reference signal through the same fiber as the optical signal (ex.—carrier signal). Two simple passive methods and an active method are disclosed herein in accordance with exemplary embodiments of the present invention whereby the reference signal may be delivered to a demodulator while minimizing susceptibility to microphonics.

In a currently available phase-sensitive or phase-encoded optical system, a local reference may be tapped off from a laser, a carrier may be supplied to a remote data encoder (ex.—phase modulator) to provide a phase-encoded signal based upon said carrier signal, then the phase-encoded signal is provided to a decoder (ex.—phase demodulator). In such a system, polarization-maintaining (PM) components may be implemented throughout. Any disturbance in the optical path length difference between the reference and signal optical path of a few percent of the wavelength (ex.—0.5 to 1.5 micrometers) results in amplitude noise on the demodulated signal. Such a system is very sensitive to acousto-mechanical disturbances (ex.—microphonics). Further, the microphonic sensitivity may be broken up into two parts: 1) local and remote sensitivity (which is localized and may be controllable through appropriate mechanical design and/or integration); and 2) transmission sensitivity (which is distributed and may be difficult to control). The transmission microphonic sensitivity may be greatly reduced by propagating both the reference and the carrier signal in the same fiber (ex.—co-transmission). Systems and methods in accordance with exemplary embodiments of the present invention are disclosed herein for enabling co-transmission to minimize microphonics.

Figure 1:
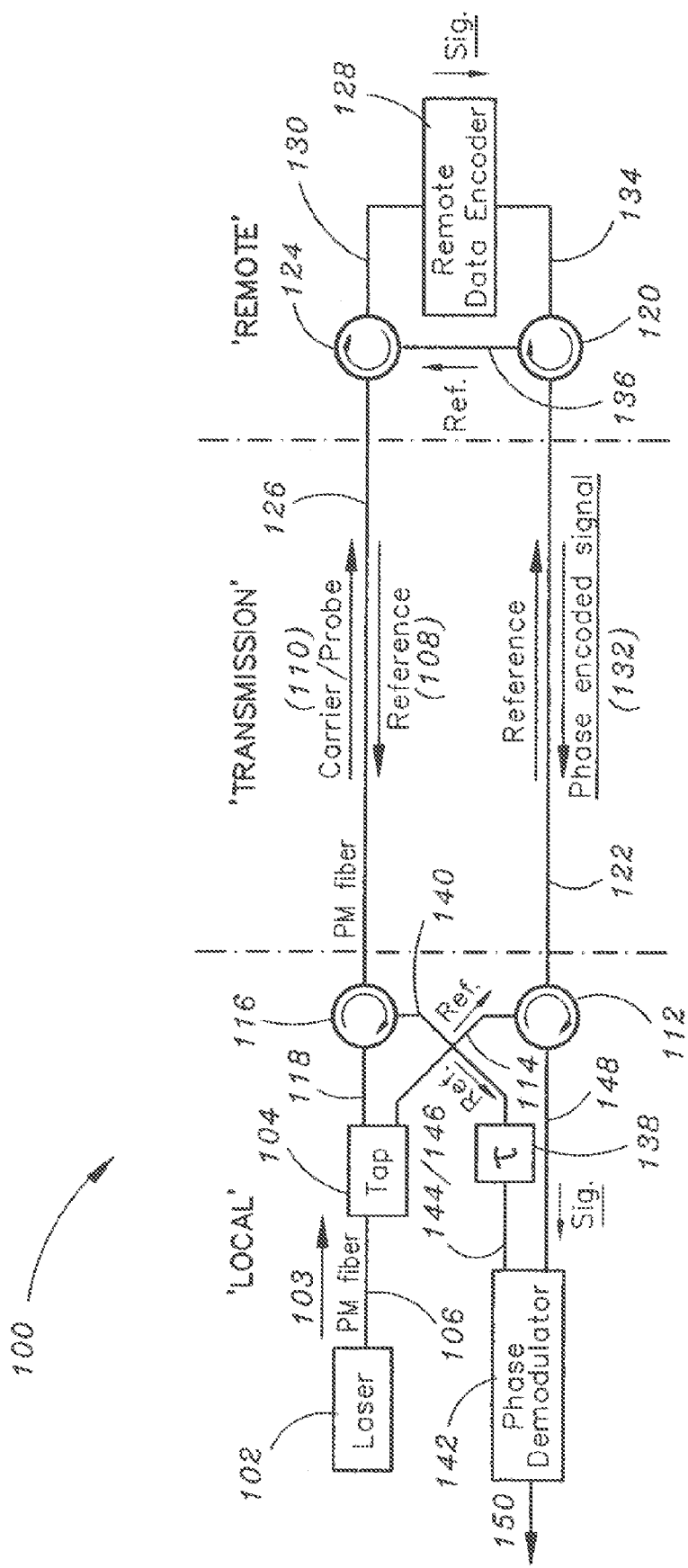
FIG. 1 is a block diagram schematic of an optical system in accordance with an exemplary embodiment of the present invention.

Referring to FIG. 1, an optical system (exs.—a phase-sensitive optical system, a phase-encoded optical system, a phase-modulated optical system, a phase-modulated transmission system) in accordance with an exemplary embodiment of the present invention is shown. In exemplary embodiments of the present invention, the optical system 100 may include a light amplification by stimulated emission of radiation (laser) device 102, said laser device 102 being configured for emitting a laser signal 103 (ex.—a laser 103). In further embodiments of the present invention, the optical system 100 may include a signal-splitting component 104 (ex.—a tap 104), said signal splitting component 104 configured for being connected to the laser-emitting device 102. For instance, the signal-splitting component 104 may be connected to the laser device 102 via a first fiber portion 106 (ex.—a first Polarization-maintaining (PM) fiber portion 106). In still further embodiments of the present invention, the signal-splitting component 104 is configured for receiving the emitted laser signal 103 from the laser device 102 via the first PM fiber portion 106 and is further configured for splitting the received laser signal 103 to provide a reference signal 108 (ex.—a local reference signal 108) and a carrier signal 110 (exs.—a carrier 108, a probe 108).

In current exemplary embodiments of the present invention, the optical system 100 may further include a first polarization-maintaining (PM) circulator 112. In further embodiments of the present invention, the first PM circulator 112 may be connected to the tap 104 via a second PM fiber portion 114. In still further embodiments of the present invention, the first PM circulator 112 may be configured for receiving the reference signal from the tap 104 via the second PM fiber portion 114. In further embodiments of the present invention, the optical system 100 may further include a second PM circulator 116. In still further embodiments of the present invention, the second PM circulator 116 may be connected to the tap 104 via a third PM fiber portion 118. In further embodiments of the present invention, the second PM circulator 116 may be configured for receiving the carrier signal 110 from the tap 104 via the third PM fiber portion 118.

In exemplary embodiments of the present invention, the optical system 100 may further include a third PM circulator 120. In further embodiments of the present invention, the third PM circulator 120 may be connected to the first PM circulator 112 via a fourth PM fiber portion 122. In still further embodiments of the present invention, the first PM circulator 112 may be configured for providing the reference signal 108 to the third PM circulator 120 via the fourth PM fiber portion 122. In further embodiments of the present invention, the optical system 100 may further include a fourth PM circulator 124. In still further embodiments of the present invention, the fourth PM circulator 124 may be connected to the second PM circulator 116 via a fifth PM fiber portion 126. In further embodiments of the present invention, the second PM circulator 116 may be configured for providing the carrier signal 110 to the fourth PM circulator 124 via the fifth PM fiber portion 126.

In current exemplary embodiments of the present invention, the optical system 100 may further include a data encoder 128 (ex.—a remote data encoder 128). In further embodiments of the present invention, the data encoder 128 may be connected to the fourth PM circulator 124 via a sixth PM fiber portion 130. In still further embodiments of the present invention, the fourth PM circulator 124 may be configured for providing the carrier signal 110 to the data encoder 128 via the sixth PM fiber portion 130. In further embodiments of the present invention, the data encoder 128 may be configured for receiving the carrier signal 110 and for generating (ex.—providing) a phase encoded signal 132 based upon the received carrier signal 110. In still further embodiments of the present invention, the data encoder 128 may be connected to the third PM circulator 120 via a seventh PM fiber portion 134. In further embodiments of the present invention, the data encoder 128 may be configured for providing (ex.—transmitting) the phase encoded signal 132 to the third PM circulator 120 via the seventh PM fiber portion 134.

In exemplary embodiments of the present invention, the third PM circulator 120 may be configured for receiving the phase encoded signal 132 from the data encoder 128. In further embodiments of the present invention, the third PM circulator 120 may be further configured for providing the phase encoded signal 132 to the first PM circulator 112 via the fourth PM fiber portion 122. In still further embodiments of the present invention, the third PM circulator 120 may be connected to the fourth PM circulator 124 via an eighth PM fiber portion 136. As mentioned above, the third PM circulator 120 may be configured for receiving the reference signal 108 from the first PM circulator 112 via the fourth PM fiber portion 122. In further embodiments of the present invention, the third PM circulator 120 may be configured for providing the received reference signal 108 to the fourth PM circulator 124 via the eighth PM fiber portion 136. In still further embodiments of the present invention, the fourth PM circulator 124 may be configured for receiving the reference signal 108 from the third PM circulator 120 via the eighth PM fiber portion 136 and for providing the received reference signal 108 to the second PM circulator 116 via the fifth PM fiber portion 126.

In current exemplary embodiments of the present invention, the optical system 100 may further include a time delay component 138 (ex.—phase alignment component). In further embodiments of the present invention, the time delay component 138 may be configured for being connected to the second PM circulator 116 via a ninth PM fiber portion 140. In still further embodiments of the present invention, the second PM circulator 116 may be configured for providing the reference signal 108 to the time delay component 138 via the ninth PM fiber portion 140. In further embodiments of the present invention, the optical system 100 may further include a phase demodulator 142. In still further embodiments of the present invention, the phase demodulator 142 may be configured for being connected to the time delay component 138 via a tenth PM fiber portion 144. In further embodiments of the present invention, the time delay component 138 may be configured for receiving the reference signal 108 from the second PM circulator 116 via the ninth PM fiber portion 140. In still further embodiments, the time delay component 138 may be further configured for providing the reference signal 108 to the phase demodulator 142 via the tenth PM fiber portion 144.

As mentioned above, the third PM circulator 120 may be configured for providing the phase encoded signal 132 to the first PM circulator 112 via the fourth PM fiber portion 122. In exemplary embodiments of the present invention, the first PM circulator 112 may be configured for being connected to the phase demodulator 142 via an eleventh PM fiber portion 148. In further embodiments of the present invention, the first PM circulator 112 may be configured for receiving the phase encoded signal 132 from the third PM circulator 120 via the fourth PM fiber portion 122. In still further embodiments of the present invention, the first PM circulator 112 may be configured for providing the received phase encoded signal 132 to the phase demodulator 142 via the eleventh fiber portion 148. In further embodiments of the present invention, the phase demodulator 142 may be configured for receiving the reference signal 108 from the time delay component 138 via the tenth PM fiber portion 144. In still further embodiments of the present invention, the phase demodulator 142 may be further configured for receiving the phase encoded signal 132 from the first PM circulator 112. In further embodiments of the present invention, the phase demodulator 142 may be configured for demodulating the phase encoded signal and providing a demodulated signal output 150 based upon the received phase encoded signal 132 and the received reference signal 108.

In current exemplary embodiments of the present invention, the laser device 102, the signal splitting component 104, the first PM circulator 112, the second PM circulator 116, the time delay component 138 and/or the phase demodulator 142 may be remotely located from the third PM circulator 120, the fourth PM circulator 124 and/or the data encoder 128 (as shown in FIG. 1). In further embodiments of the present invention, the carrier signal 110 and the reference signal 108 may propagate through a same physical fiber (ex.—the fifth PM fiber portion 126) in opposite directions (as shown in FIG. 1), thereby allowing the carrier signal 110 and the reference signal 108 to experience the same vibration signature. In still further embodiments of the present invention, the reference signal 108 and the phase encoded signal 132 may propagate through a same physical fiber (ex.—the fourth PM fiber portion 122) in opposite directions (as shown in FIG. 1). In further embodiments of the present invention, one or more of the PM circulators (112, 116, 120 and 124) are configured for multiplexing and/or demultiplexing the carrier signal 110 and/or the reference signal 108. In still further embodiments of the present invention, the optical system 100 may promote reduced microphonic sensitivity and/or may promote reduced coherence length requirements for the laser signal 103. In further embodiments of the present invention, the optical system 100 may implement passive multiplexing techniques that do not require power or control (ex.—may eliminate or substantially reduce the need for active phase stabilization).

Figure 2:
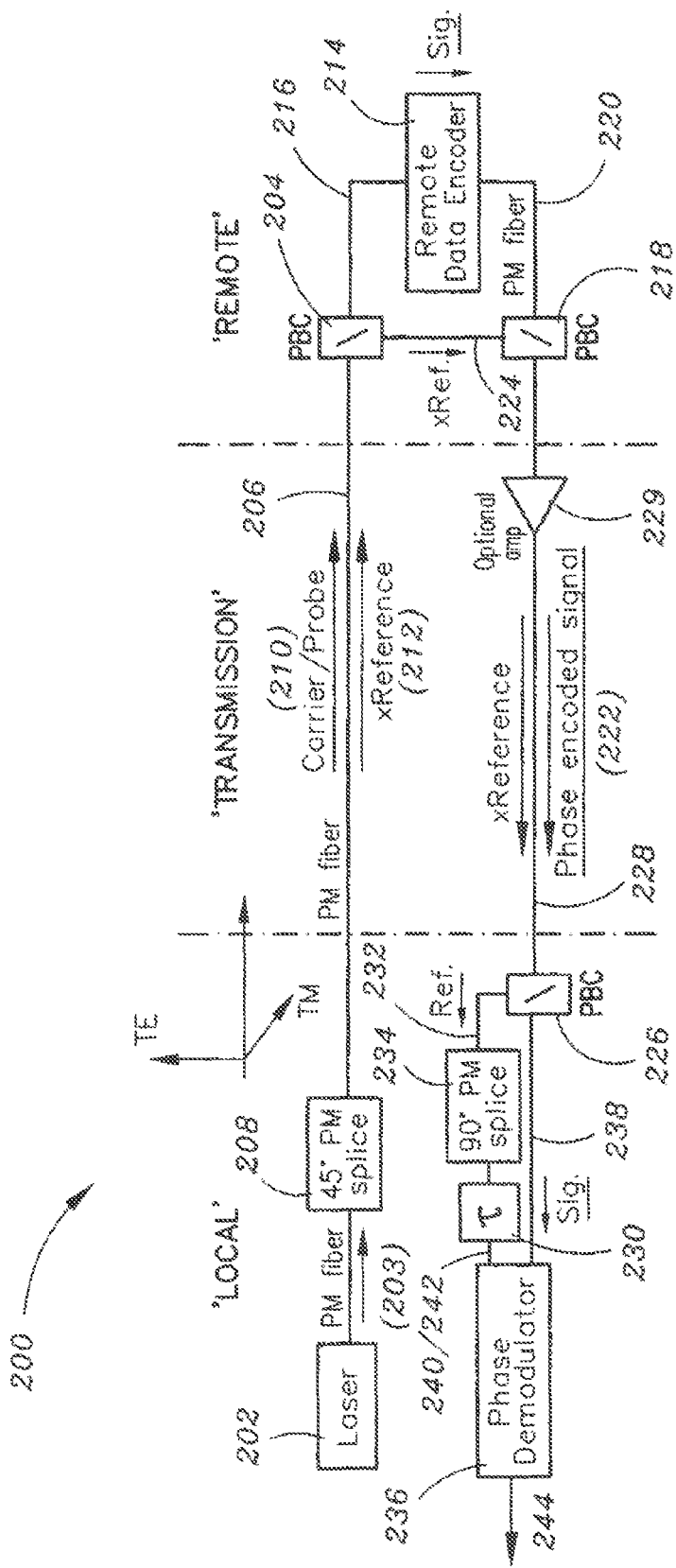
FIG. 2 is a block diagram schematic of an optical system in accordance with an alternative exemplary embodiment of the present invention.

Referring to FIG. 2, an optical system (exs.—a phase-sensitive optical system, a phase-encoded optical system, a phase-modulated optical system) in accordance with an alternative exemplary embodiment of the present invention is shown. In exemplary embodiments of the present invention, the optical system 200 may include a laser device 202, said laser device being configured for emitting a laser signal 203. In further embodiments of the present invention, the optical system 200 may further include a first polarization maintaining component 204 (ex.—a first polarization beam combiner (PBC) 204). In still further embodiments of the present invention, the first PBC 204 and the laser device 202 may be connected via a first PM fiber portion 206. In further embodiments of the present invention, the first PM fiber portion 206 may include and/or may implement a first PM circulator 208 (ex.—a forty-five degree PM splice), the first PM circulator 208 configured for splitting the laser signal 203 to provide a carrier signal 210 and a reference signal 212 to the first PBC 204 via the first PM fiber portion 206.

In exemplary embodiments of the present invention, the optical system 200 may include a data encoder 214. In further embodiments of the present invention, the data encoder 214 may be connected to the first PBC 204 via a second PM fiber portion 216. In still further embodiments of the present invention, the first PBC 204 may be configured for receiving the carrier signal 210 and the reference signal 212 from the laser device 202 via the first PM fiber portion 206. In further embodiments of the present invention, the first PBC 204 may be further configured for providing the carrier signal 210 to the data encoder 214 via the second PM fiber portion 216. In still further embodiments of the present invention, the optical system 200 may further include a second polarization maintaining component 218 (ex.—a second PBC), said second PBC 218 being configured for being connected to the data encoder 214 via a third PM fiber portion 220. In further embodiments of the present invention, the data encoder 214 may be configured for receiving the carrier signal 210 and for generating (ex.—providing) a phase encoded signal 222 based upon the received carrier signal 210. In still further embodiments of the present invention, the data encoder 214 may provide (ex.—transmit) the phase encoded signal 222 to the second PBC 218 via the third PM fiber portion 220.

In current exemplary embodiments of the present invention, the first PBC 204 and the second PBC 218 may be configured for being connected via a fourth PM fiber portion 224. In further embodiments of the present invention, the first PBC 204 may be configured for providing the reference signal 212 to the second PBC 218 via the fourth PM fiber portion 224. In still further embodiments of the present invention, the second PBC 218 may be configured for receiving the reference signal 212 from the first PBC 204 via the fourth PM fiber portion 224. In further embodiments of the present invention, the optical system 200 may include a third polarization maintaining component 226 (ex.—a third PBC), the third PBC 226 being connected to the second PBC 218 via a fifth PM fiber portion 228. In still further embodiments of the present invention, the second PBC 218 may be configured for providing the received reference signal 212 and the received phase encoded signal 222 to the third PBC 226 via the fifth PM fiber portion 228. In an alternative exemplary embodiment, an amplifier 229 (ex.—a single pass optical amplifier) may be connected between the second PBC 218 and the third PBC, such that the reference signal 212 and the phase encoded signal 222 may be provided from the second PBC 218 to the amplifier 229, said reference signal 212 and phase encoded signal 222 may be amplified by the amplifier 229, and the amplified reference signal and amplified phase encoded signal may then be provided to the third PBC 226 via the fifth PM fiber portion 228.

In exemplary embodiments of the present invention, the optical system 200 may further include a time delay component 230. In further embodiments of the present invention, the time delay component 230 may be configured for being connected to the third PBC 226 via a sixth PM fiber portion 232. In still further embodiments of the present invention, the sixth PM fiber portion 232 may include and/or may implement a second PM circulator 234 (ex.—a ninety degree PM splice). In further embodiments of the present invention, the optical system 200 may further include a phase demodulator 236, said phase demodulator being connected to the third PBC 226 via a seventh PM fiber portion 238, said phase demodulator 236 being further connected to the time delay component 230 via an eighth PM fiber portion 240. In still further embodiments of the present invention, the third PBC 226 may be configured for receiving the reference signal 212 and the phase encoded signal 222 from the second PBC 218. In further embodiments of the present invention, the third PBC 226 may be configured for providing the received reference signal 212 to the time delay component 230 via the sixth PM fiber portion 232. In still further embodiments of the present invention, the third PBC 226 may be configured for providing the received phase encoded signal 222 to the phase demodulator 236 via the seventh fiber portion 238. In further embodiments of the present invention, the time delay component 230 may be configured for receiving the reference signal 212 from the third PBC 226 via the sixth PM fiber portion 232. In still further embodiments of the present invention, the time delay component 230 may be configured for providing the reference signal 212 to the phase demodulator 236 via the eighth PM fiber portion 240. In further embodiments of the present invention, the phase demodulator 236 may be configured for receiving the reference signal 212 via the eighth fiber portion 240 and may be further configured for receiving the phase encoded signal 222 via the seventh fiber portion 238. In still further embodiments of the present invention, the phase demodulator 236 may be configured for demodulating the phase encoded signal and providing a demodulated signal output 244 based upon the received phase encoded signal 222 and the received reference signal 212.

In current exemplary embodiments of the present invention, the laser device 202, the first PM circulator 208, the second PM circulator 234, the time delay component 230, the third PBC 226, and/or the phase demodulator 236 may be remotely located from the first PBC 204, the second PBC 218, and/or the data encoder 214 (as shown in FIG. 2). In further embodiments of the present invention, the carrier signal 210 and the reference signal 212 may propagate through a same physical fiber (ex.—the first PM fiber portion 206) in the same direction (as shown in FIG. 2). In still further embodiments of the present invention, the reference signal 212 and the phase encoded signal 222 may propagate through a same physical fiber (ex.—the fifth PM fiber portion 228) in the same direction (as shown in FIG. 2). In further embodiments of the present invention, the optical system 200 implements PM circulators (208, 234) for multiplexing and/or demultiplexing the carrier signal 210 and/or the reference signal 212. In still further embodiments of the present invention, the optical system 200 may promote reduced microphonic sensitivity and/or may promote reduced coherence length requirements for the laser signal 203. In further embodiments of the present invention, the optical system 200 may implement passive multiplexing techniques that do not require power or control. In still further embodiments of the present invention, the optical system 200 allows for the PBCs (204, 218, 226) to be monolithically integrated with other components of the system 200.

In an alternative embodiment of the present invention, the laser device 202 and the phase demodulator 236 do not have to be co-located, thereby providing an optical system which may be useful for phased array applications.

Figure 3:
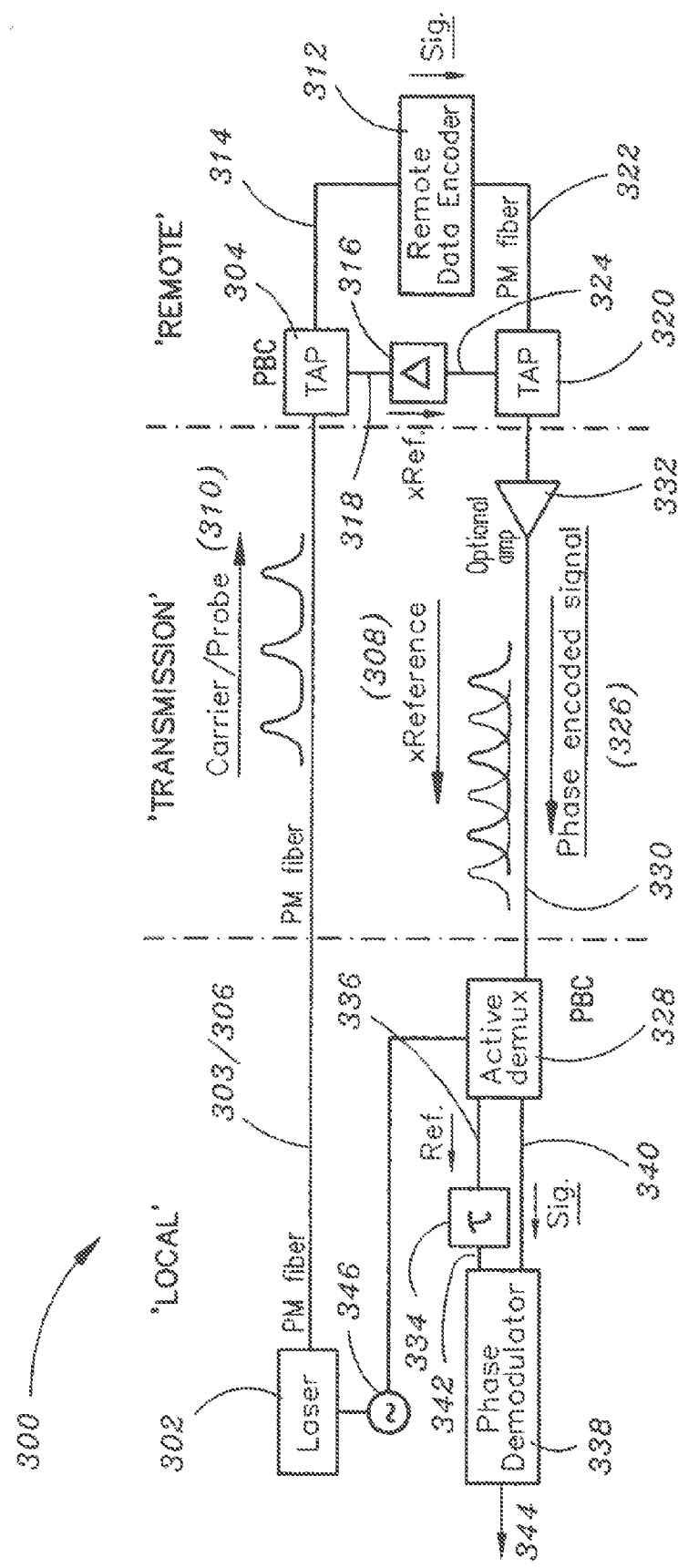
FIG. 3 is a block diagram schematic of an optical system in accordance with a further alternative exemplary embodiment of the present invention.

Referring to FIG. 3, an optical system (exs.—a phase-sensitive optical system, a phase-encoded optical system, a phase-modulated optical system) in accordance with a further alternative exemplary embodiment of the present invention is shown. In exemplary embodiments of the present invention, the optical system 300 may include a laser device 302, said laser device 302 being configured for emitting a laser signal 303. In further embodiments of the present invention, the optical system 300 may further include a signal splitting component 304 (exs.—a tap, a PBC). For instance, the signal splitting component 304 may be connected to the laser device 302 via a first PM fiber portion 306. In still further embodiments of the present invention, the signal splitting component 304 is configured for receiving the emitted laser signal 303 from the laser device 302 via the first PM fiber portion 306 and is further configured for splitting the received laser signal 303 to provide a reference signal 308 and a carrier signal 310.

In exemplary embodiments of the present invention, the optical system 300 may further include a data encoder 312, said data encoder 312 configured for being connected to the signal splitting component 304 via a second PM fiber portion 314. In further embodiments of the present invention, the optical system 300 may further include a first time delay component 316, said first time delay component 316 configured for being connected to the signal splitting component 304 via a third PM fiber portion 318. In still further embodiments of the present invention, the signal splitting component 304 is configured for transmitting the reference signal 308 to the first time delay component 316 via the third PM fiber portion 318. In further embodiments of the present invention, the signal splitting component 304 is further configured for transmitting the carrier signal 310 to the data encoder 312 via the second PM fiber portion 314. In still further embodiments of the present invention, the optical system 300 further includes a PM component 320 (exs.—a tap, an active multiplexer (for reducing loss), a PM circulator), the PM component 320 configured for being connected to the data encoder 312 via a fourth PM fiber portion 322, the PM component 320 further configured for being connected to the first time delay component 316 via a fifth PM fiber portion 324.

In current exemplary embodiments of the present invention, the data encoder 312 may be configured for receiving the carrier signal 310 from the signal splitting component 304 via the second PM fiber portion 314. In further embodiments of the present invention, the first time delay component 316 may be configured for receiving the reference signal 308 from the signal splitting component 304 via the third PM fiber portion 318. In still further embodiments of the present invention, the data encoder 312 may be configured for providing (exs.—generating, producing) a phase encoded signal 326 based upon the received carrier signal 310. In further embodiments of the present invention, the data encoder 312 may be configured for transmitting the phase encoded signal 326 to the PM component 320 via the fourth PM fiber portion 322. In still further embodiments of the present invention, the first time delay component 316 may be configured for transmitting the reference signal 308 to the PM component 320 via the fifth PM fiber portion 324.

In exemplary embodiments of the present invention, the PM component 320 is configured for receiving the reference signal 308 via the fifth PM fiber portion 324 and is further configured for receiving the phase encoded signal 326 from the data encoder 312 via the fourth PM fiber portion 322. In further embodiments of the present invention, the optical system 300 may further include an active demultiplexer 328, said active demultiplexer 328 configured for being connected to the PM component 320 via a sixth PM fiber portion 330. In still further embodiments of the present invention, the PM component 320 may be configured for providing the reference signal 308 and the phase encoded signal 326 to the active demultiplexer 328 via the sixth PM fiber portion 330. In alternative embodiments of the present invention, an amplifier 332 (ex.—a single pass optical amplifier) may be connected between the PM component 320 and the active demultiplexer 328, such that the reference signal 308 and the phase encoded signal 326 may be provided from the PM component to the amplifier 332, said reference signal 308 and phase encoded signal 326 may be amplified by the amplifier, and the amplified reference signal and amplified phase encoded signal may then be provided to the active demultiplexer 328 via the sixth PM fiber portion 330.

In current exemplary embodiments of the present invention, the active demultiplexer 328 may be configured for receiving the reference signal 308 and the phase encoded signal 326 from the PM component 320 via the sixth PM fiber portion 330. In further embodiments of the present invention, the optical system 300 may include a second time delay component 334, said second time delay component 334 being connected to the active demultiplexer 328 via a seventh PM fiber portion 336. In still further embodiments of the present invention, the optical system 300 may further include a phase demodulator 338, said phase demodulator 338 being connected to the active demultiplexer 328 via an eighth PM fiber portion 340, said phase demodulator 338 being connected to the second time delay component 334 via a ninth PM fiber portion 342. In further embodiments of the present invention, the active demultiplexer 328 may be configured for providing the reference signal 308 to the second time delay component 334 via the seventh PM fiber portion 336. In still further embodiments of the present invention, the active demultiplexer 328 may be configured for providing the phase encoded signal 326 to the phase demodulator 338 via the eighth PM fiber portion 340. In further embodiments of the present invention, the second time delay component 334 may be configured for receiving the reference signal 308 from the active demultiplexer 328 via the seventh PM fiber portion 336 and is further configured for providing the received reference signal 308 to the phase demodulator 338 via the ninth PM fiber portion 342.

In exemplary embodiments of the present invention, the phase demodulator 342 may be configured for receiving the reference signal 308 from the second time delay component 334 via the ninth PM fiber portion 342 and may be further configured for receiving the phase encoded signal 326 from the active demultiplexer 328 via the eighth PM fiber portion 340. In further embodiments of the present invention, the phase demodulator 342 may be configured for demodulating the phase encoded signal and providing a demodulated signal output 344 based upon the received phase encoded signal 326 and the received reference signal 308. In still further embodiments of the present invention, the optical system 300 may include a signal generator 346, said signal generator 346 being connected to the laser device 302 and the active demultiplexer 328.

In current exemplary embodiments of the present invention, the laser device 302, the phase demodulator 338, the second time delay component 334, the signal generator 346, and/or the active demultiplexer 328 may be remotely located from the signal splitting component 304, the first time delay component 316, the PM component 320, and/or the data encoder 312 (as shown in FIG. 3). In further embodiments of the present invention, pulse multiplexing and pulse demultiplexing may be monolithically integrated into the optical system 300 shown in FIG. 3. In still further embodiments of the present invention, the optical system 300 may multiplex and demultiplex the carrier signal 310 and the reference signal 308 via PM circulators. In further embodiments of the present invention, the optical system 300 may promote reduced microphonic sensitivity and/or may promote reduced coherence length requirements for the laser signal 303.

Figure 4A:
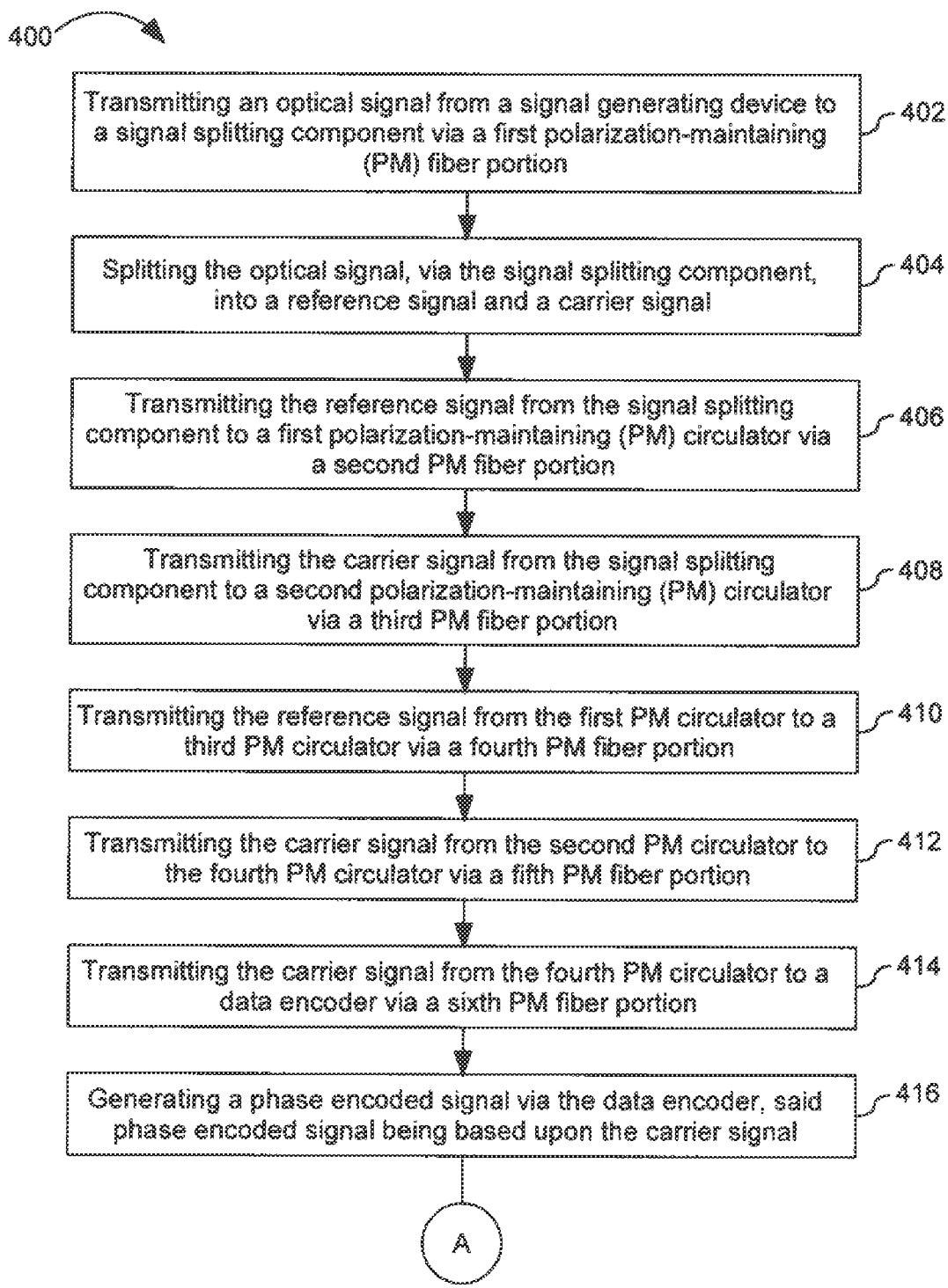
FIGS. 4A and 4B depict a flowchart illustrating a method for optical signal routing in an optical system for promoting reduced mechanical sensitivity of phase sensitive optical signals in accordance with an exemplary embodiment of the present invention.
Figure 4B:
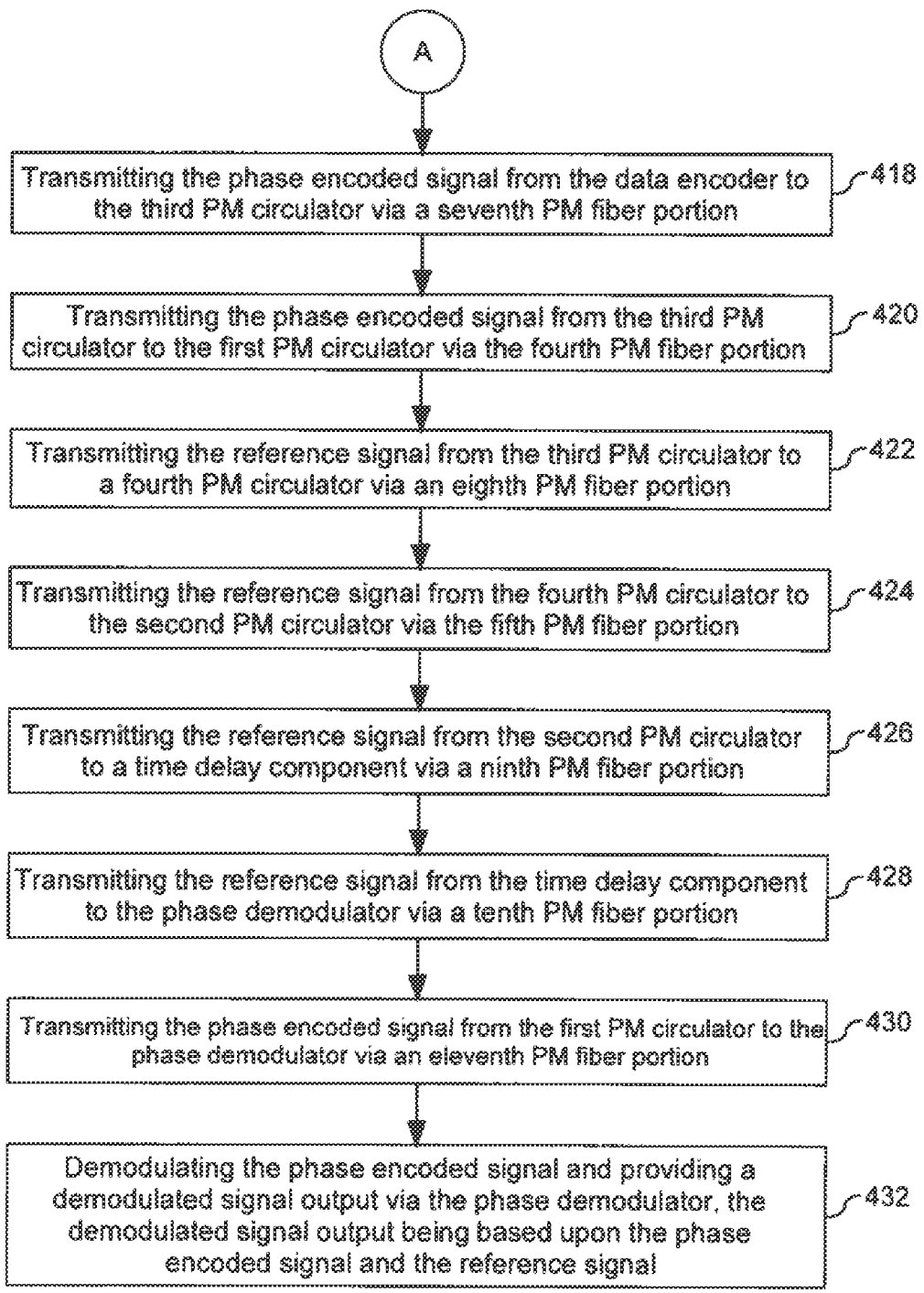

FIGS. 4A and 4B depict a flowchart illustrating a method for optical signal routing in an optical system (ex.—such as via the optical system 100 shown in FIG. 1) in accordance with an exemplary embodiment of the present invention. The method 400 may include the step of transmitting an optical signal (ex.—a laser signal) from a signal generating device (ex.—a laser device) to a signal splitting component via a first polarization-maintaining (PM) fiber portion 402. The method 400 may further include the step of splitting the optical signal, via the signal splitting component, into a reference signal and a carrier signal 404. The method 400 may further include the step of transmitting the reference signal from the signal splitting component to a first polarization-maintaining (PM) circulator via a second PM fiber portion 406. The method 400 may further include the step of transmitting the carrier signal from the signal splitting component to a second polarization-maintaining (PM) circulator via a third PM fiber portion 408.

In exemplary embodiments of the present invention, the method 400 may further include the step of transmitting the reference signal from the first PM circulator to a third PM circulator via a fourth PM fiber portion 410. The method 400 may further include the step of transmitting the carrier signal from the second PM circulator to the fourth PM circulator via a fifth PM fiber portion 412. The method 400 may further include the step of transmitting the carrier signal from the fourth PM circulator to a data encoder via a sixth PM fiber portion 414. The method 400 may further include the step of generating a phase encoded signal via the data encoder, said phase encoded signal being based upon the carrier signal 416. The method 400 may further include the step of transmitting the phase encoded signal from the data encoder to the third PM circulator via a seventh PM fiber portion 418.

In current exemplary embodiments of the present invention, the method 400 may further include the step of transmitting the phase encoded signal from the third PM circulator to the first PM circulator via the fourth PM fiber portion 420. The method 400 may further include the step of transmitting the reference signal from the third PM circulator to a fourth PM circulator via an eighth PM fiber portion 422. The method 400 may further include the step of transmitting the reference signal from the fourth PM circulator to the second PM circulator via the fifth PM fiber portion 424. The method 400 may further include the step of transmitting the reference signal from the second PM circulator to a time delay component via a ninth PM fiber portion 426. The method 400 may further include the step of transmitting the reference signal from the time delay component to the phase demodulator via a tenth PM fiber portion 428.

In exemplary embodiments of the present invention, the method 400 may further include the step of transmitting the phase encoded signal from the first PM circulator to the phase demodulator via an eleventh PM fiber portion 430. The method 400 may further include the steps of demodulating the phase encoded signal and providing a demodulated signal output (ex.—a demodulated output signal) via the phase demodulator, the demodulated signal output being based upon the phase encoded signal and the reference signal 432.

Figure 5A:
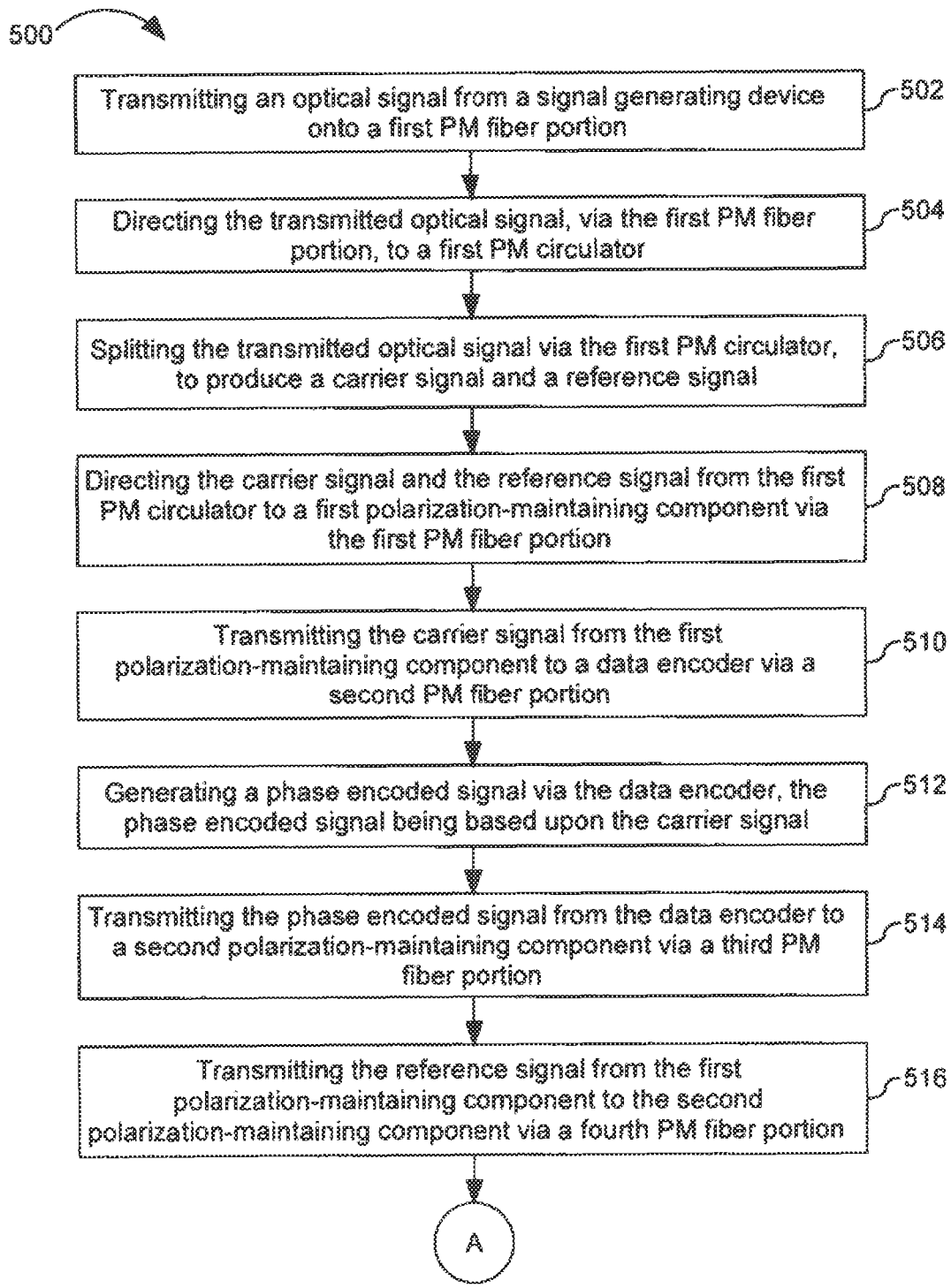
FIGS. 5A and 5B depict a flowchart illustrating a method for optical signal routing in an optical system for promoting reduced mechanical sensitivity of phase sensitive optical signals in accordance with an alternative exemplary embodiment of the present invention.
Figure 5B:
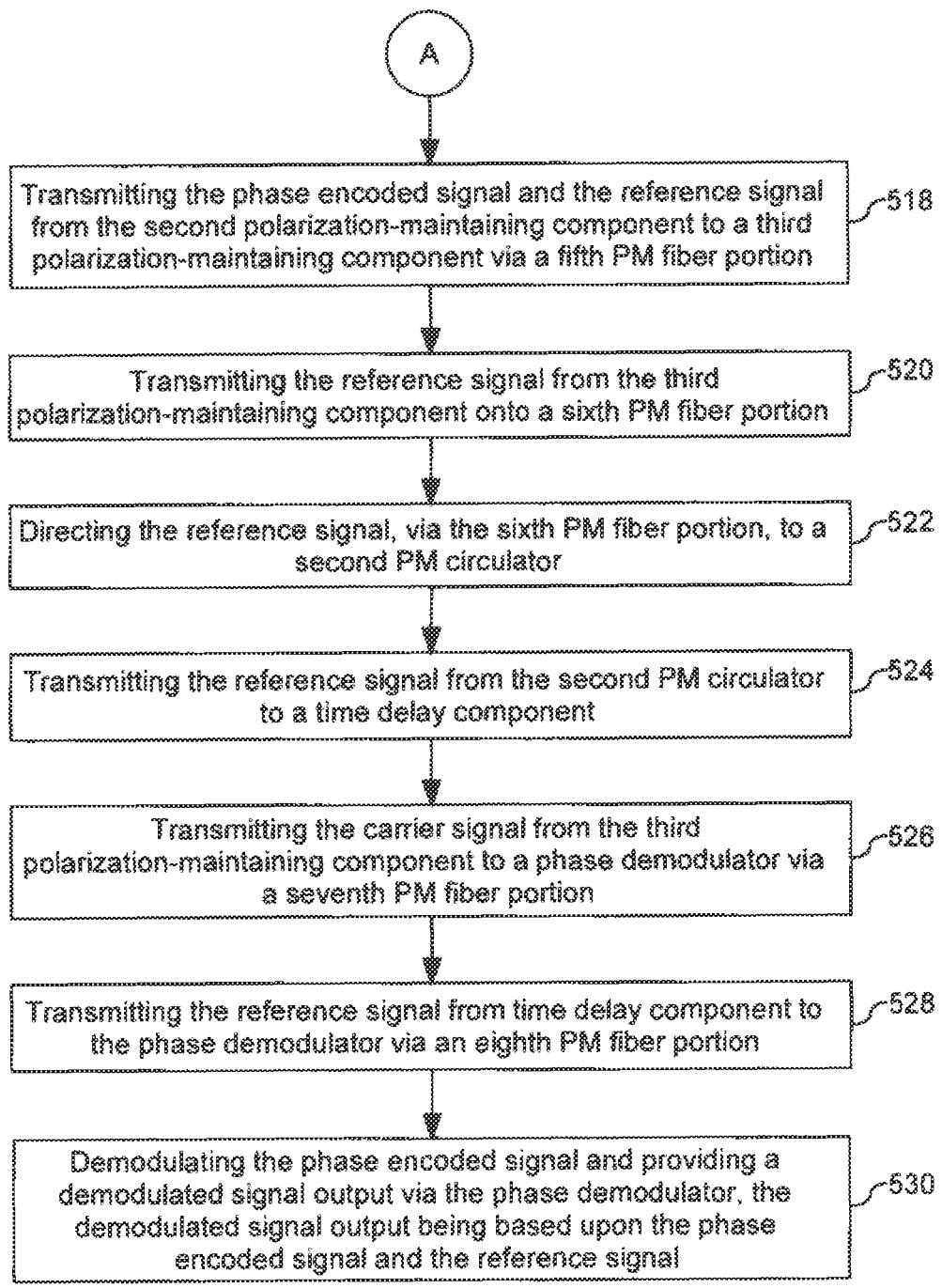

FIGS. 5A and 5B depict a flowchart illustrating a method for optical signal routing in an optical system (ex.—such as via the optical system 200 shown in FIG. 2) in accordance with an exemplary embodiment of the present invention. The method 500 may include the step of transmitting an optical signal (ex.—a laser signal) from a signal generating device (ex.—a laser device) onto a first PM fiber portion 502. The method 500 may further include the step of directing the transmitted optical signal, via the first PM fiber portion, to a first PM circulator (ex.—a forty-five degree splice) 504. The method 500 may further include the step of splitting the transmitted optical signal via the first PM circulator, to produce a carrier signal and a reference signal 506. The method 500 may further include the step of directing the carrier signal and the reference signal from the first PM circulator to a first polarization-maintaining component (ex.—a first Polarization Beam Combiner (PBC)) via the first PM fiber portion 508.

In current exemplary embodiments of the present invention, the method 500 may further include the step of transmitting the carrier signal from the first polarization-maintaining component to a data encoder via a second PM fiber portion 510. The method 500 may further include the step of generating a phase encoded signal via the data encoder, the phase encoded signal being based upon the carrier signal 512. The method 500 may further include the step of transmitting the phase encoded signal from the data encoder to a second polarization-maintaining component (ex.—a second PBC) via a third PM fiber portion 514. The method 500 may further include the step of transmitting the reference signal from the first polarization-maintaining component to the second polarization-maintaining component via a fourth PM fiber portion 516. The method 500 may further include the step of transmitting the phase encoded signal and the reference signal from the second polarization-maintaining component to a third polarization-maintaining component (ex.—a third PBC) via a fifth PM fiber portion 518.

In exemplary embodiments of the present invention, the method 500 may further include the step of transmitting the reference signal from the third polarization-maintaining component onto a sixth PM fiber portion 520. The method 500 may further include the step of directing the reference signal, via the sixth PM fiber portion, to a second PM circulator (ex.—a ninety degree splice) 522. The method 500 may further include the step of transmitting the reference signal from the second PM circulator to a time delay component 524. The method 500 may further include the step of transmitting the carrier signal from the third polarization-maintaining component to a phase demodulator via a seventh PM fiber portion 526. The method 500 may further include the step of transmitting the reference signal from time delay component to the phase demodulator via an eighth PM fiber portion 528. The method 500 may further include the steps of demodulating the phase encoded signal and providing a demodulated signal output (ex.—a demodulated output signal) via the phase demodulator, the demodulated signal output being based upon the phase encoded signal and the reference signal 530.

Figure 6A:
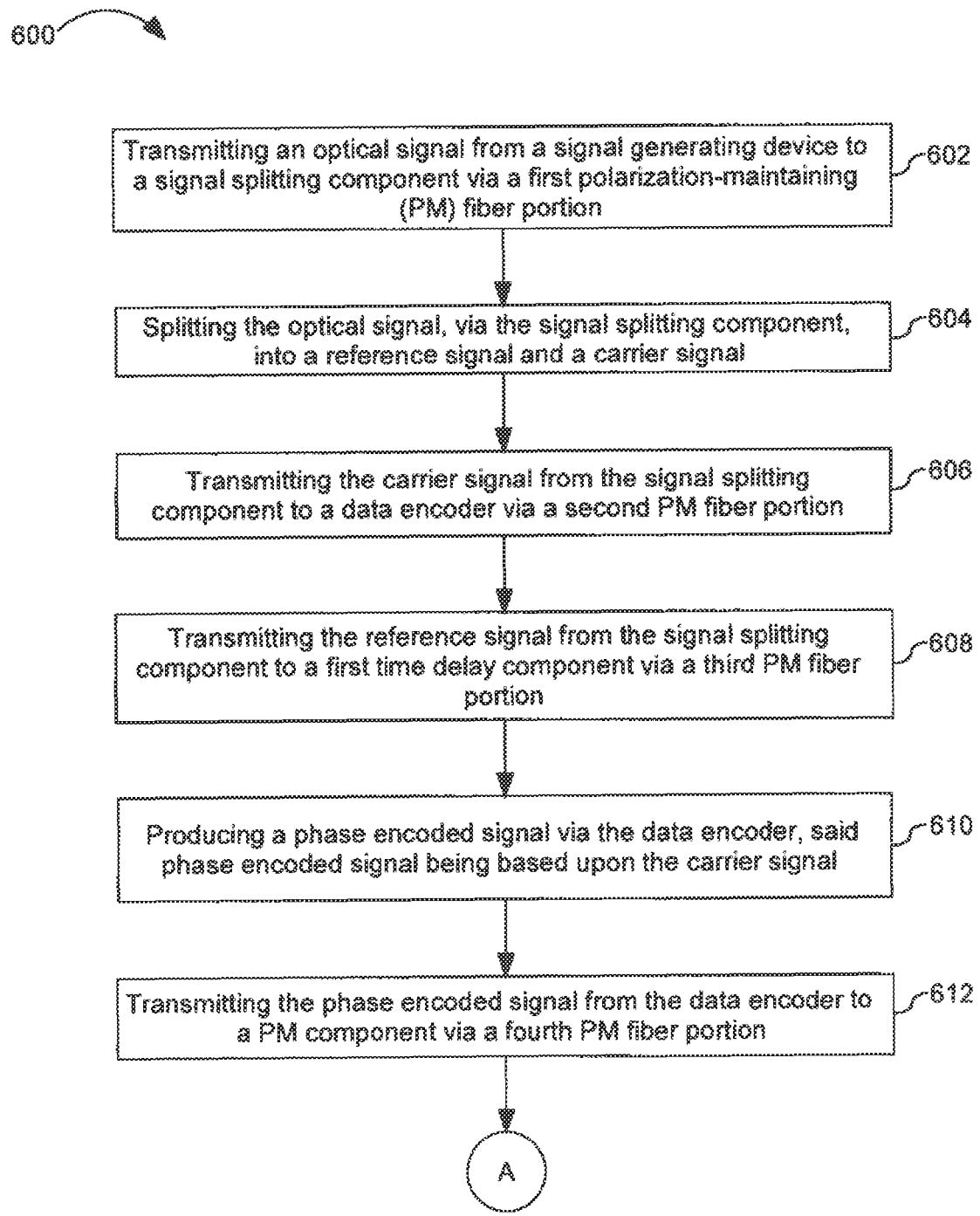
FIGS. 6A and 6B depict a flowchart illustrating a method for optical signal routing in an optical system for promoting reduced mechanical sensitivity of phase sensitive optical signals in accordance with a further alternative exemplary embodiment of the present invention.
Figure 6B:
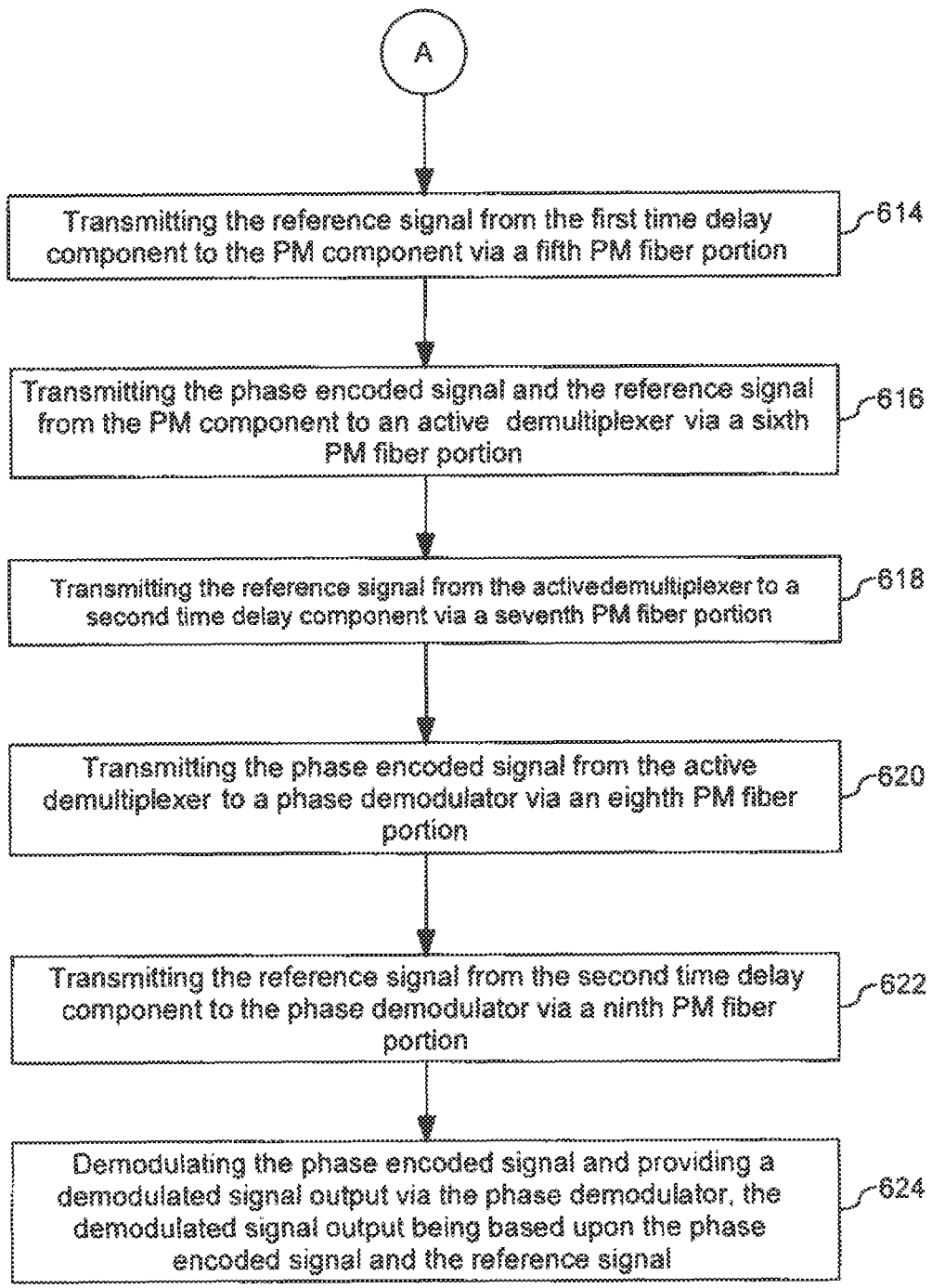

FIGS. 6A and 6B depict a flowchart illustrating a method for optical signal routing in an optical system (ex.—such as via the optical system 300 shown in FIG. 3) in accordance with an exemplary embodiment of the present invention. The method 600 may include the step of transmitting an optical signal (ex.—a laser signal) from a signal generating device (ex.—a laser device) to a signal splitting component (exs.—a tap, a PBC) via a first polarization-maintaining (PM) fiber portion 602. The method 600 may further include the step of splitting the optical signal, via the signal splitting component, into a reference signal and a carrier signal 604. The method 600 may further include the step of transmitting the carrier signal from the signal splitting component to a data encoder via a second PM fiber portion 606. The method 600 may further include the step of transmitting the reference signal from the signal splitting component to a first time delay component via a third PM fiber portion 608.

In current exemplary embodiments of the present invention, the method 600 may further include the step of producing a phase encoded signal via the data encoder, said phase encoded signal being based upon the carrier signal 610. The method 600 may further include the step of transmitting the phase encoded signal from the data encoder to a PM component (exs.—a tap, an active multiplexer, a PM circulator) via a fourth PM fiber portion 612. The method 600 may further include the step of transmitting the reference signal from the first time delay component to the PM component via a fifth PM fiber portion 614. The method 600 may further include the step of transmitting the phase encoded signal and the reference signal from the PM component to an active demultiplexer via a sixth PM fiber portion 616. The method 600 may further include the step of transmitting the reference signal from the active demultiplexer to a second time delay component via a seventh PM fiber portion 618.

In exemplary embodiments of the present invention, the method 600 may further include the step of transmitting the phase encoded signal from the active demultiplexer to a phase demodulator via an eighth PM fiber portion 620. The method 600 may further include the step of transmitting the reference signal from the second time delay component to the phase demodulator via a ninth PM fiber portion 622. The method 600 may further include the steps of demodulating the phase encoded signal and providing a demodulated signal output (ex.—a demodulated output signal) via the phase demodulator, the demodulated signal output being based upon the phase encoded signal and the reference signal 624.

In current exemplary embodiments of the present invention, the above-referenced system(s) and method(s) may have a number of potential areas of application, such as remoted photonic Analog-to-Digital Converters (ADCs), Radio Frequency (RF) optical phased arrays, and/or other phase sensitive RF based techniques based upon photonics. Photonic applications or implementations may promote a decrease in Size Weight and Power (SWAP) compared with standard RF techniques.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An optical system, comprising:
    a laser device, the laser device configured for transmitting a laser signal;
    a first polarization beam combiner, the first polarization beam combiner being connected to the laser device via a first polarization maintaining fiber portion, the first polarization maintaining fiber portion implementing a forty-five degree polarization maintaining splice, the forty-five degree polarization maintaining splice configured for splitting the laser signal to provide a carrier signal and a reference signal to the first polarization beam combiner via the first polarization maintaining fiber portion;
    a data encoder, the data encoder being connected to the first polarization beam combiner via a second polarization maintaining fiber portion, the data encoder configured for receiving the carrier signal from the first polarization beam combiner via the second polarization maintaining fiber portion, the data encoder configured for providing a phase encoded signal based upon the received carrier signal; and
    a second polarization beam combiner, the second polarization beam combiner being connected to the data encoder via a third polarization maintaining fiber portion, the second polarization beam combiner being connected to the first polarization beam combiner via a fourth polarization maintaining fiber portion, the second polarization beam combiner configured for receiving the phase encoded signal from the data encoder via the third polarization maintaining fiber portion, the second polarization beam combiner being configured for receiving the reference signal from the first polarization beam combiner via the fourth polarization maintaining fiber portion.

2. An optical system as claimed in claim 1, further comprising:
    a third polarization beam combiner, the third polarization beam combiner being connected to the second polarization beam combiner via a fifth polarization maintaining fiber portion, the third polarization beam combiner configured for receiving the phase encoded signal and the reference signal from the second polarization beam combiner via the fifth polarization maintaining fiber portion.

3. An optical system as claimed in claim 2, further comprising:
    a time delay component, the time delay component being connected to the third polarization beam combiner via a sixth polarization maintaining fiber portion, the sixth polarization maintaining fiber portion implementing a ninety degree polarization maintaining splice, the time delay component configured for receiving the reference signal from the third polarization beam combiner via the sixth polarization maintaining fiber.

4. An optical system as claimed in claim 3, further comprising:
    a phase demodulator, the phase demodulator being connected to the third polarization beam combiner via a seventh polarization maintaining fiber portion, the phase demodulator being connected to the time delay component via an eighth polarization maintaining fiber portion, the phase demodulator configured for receiving the reference signal from the time delay component, the phase demodulator further configured for receiving the phase encoded signal from the third polarization beam combiner, the phase demodulator further configured for demodulating the phase encoded signal and providing a demodulated signal output based upon the received phase encoded signal and the received reference signal.

5. An optical system as claimed in claim 4, wherein the carrier signal and the reference signal propagate through the first polarization maintaining fiber portion in a same direction and the phase encoded signal and the reference signal propagate through the fifth polarization maintaining fiber portion in a same direction.

6. A method for optical signal routing in an optical system, said method comprising:
transmitting an optical signal from a signal generating device onto a first PM fiber portion;
directing the transmitted optical signal, via the first PM fiber portion, to a first PM circulator, the first PM circulator comprising at least one of: a forty-five degree PM splice and a ninety degree PM splice;
splitting the transmitted optical signal via the first PM circulator, to produce a carrier signal and a reference signal;
directing the carrier signal and the reference signal from the first PM circulator to a first polarization-maintaining component via the first PM fiber portion; and
transmitting the carrier signal from the first polarization-maintaining component to a data encoder via a second PM fiber portion.

7. A method as claimed in claim 6, further comprising:
generating a phase encoded signal via the data encoder, the phase encoded signal being based upon the carrier signal; and
transmitting the phase encoded signal from the data encoder to a second polarization-maintaining component via a third PM fiber portion.

8. A method as claimed in claim 7, further comprising:
transmitting the reference signal from the first polarization-maintaining component to the second polarization-maintaining component via a fourth PM fiber portion; and
transmitting the phase encoded signal and the reference signal from the second polarization-maintaining component to a third polarization-maintaining component via a fifth PM fiber portion.

9. A method as claimed in claim 8, further comprising:
transmitting the reference signal from the third polarization-maintaining component onto a sixth PM fiber portion; and
directing the reference signal, via the sixth PM fiber portion, to a second PM circulator, the second PM circulator comprising at least one of: a forty-five degree PM splice and a ninety degree PM splice.

10. A method as claimed in claim 9, further comprising:
transmitting the reference signal from the second PM circulator to a time delay component; and
transmitting the carrier signal from the third polarization-maintaining component to a phase demodulator via a seventh PM fiber portion.

11. A method as claimed in claim 10, further comprising:
transmitting the reference signal from time delay component to the phase demodulator via an eighth PM fiber portion.

12. A method as claimed in claim 11, further comprising:
demodulating the phase encoded signal and providing a demodulated signal output via the phase demodulator, the demodulated signal output being based upon the phase encoded signal and the reference signal.

13. A method for optical signal routing in an optical system, said method comprising:
transmitting an optical signal from a signal generating device to a signal splitting component via a first polarization-maintaining (PM) fiber portion;
splitting the optical signal, via the signal splitting component, into a reference signal and a carrier signal;
transmitting the carrier signal from the signal splitting component to a data encoder via a second PM fiber portion;
transmitting the reference signal from the signal splitting component to a first time delay component via a third PM fiber portion;
producing a phase encoded signal via the data encoder, said phase encoded signal being based upon the carrier signal;
transmitting the phase encoded signal from the data encoder to a PM component via a fourth PM fiber portion;
transmitting the reference signal from the first time delay component to the PM component via a fifth PM fiber portion; and
transmitting the phase encoded signal and the reference signal from the PM component to an active demultiplexer via a sixth PM fiber portion.

14. A method as claimed in claim 13, further comprising:
transmitting the reference signal from the active demultiplexer to a second time delay component via a seventh PM fiber portion.

15. A method as claimed in claim 14, further comprising:
transmitting the phase encoded signal from the active demultiplexer to a phase demodulator via an eighth PM fiber portion.

16. A method as claimed in claim 15, further comprising:
transmitting the reference signal from the second time delay component to the phase demodulator via a ninth PM fiber portion.

17. A method as claimed in claim 16, further comprising:
demodulating the phase encoded signal and providing a demodulated signal output via the phase demodulator, the demodulated signal output being based upon the phase encoded signal and the reference signal.

* * * * *